(12) United States Patent
Takimoto et al.

(10) Patent No.: US 8,802,293 B2
(45) Date of Patent: Aug. 12, 2014

(54) POSITIVE ELECTRODE MATERIAL

(75) Inventors: Kazuki Takimoto, Tokyo (JP); Hideo Yanagita, Tokyo (JP); Tsutomu Kikuchi, Tokyo (JP)

(73) Assignees: Fuji Jukogyo Kabushiki Kaisha, Tokyo (JP); Nippon Chemical Industrial Co., Ltd., Tokyo (JP)

( * ) Notice: Subject to any disclaimer, the term of this patent is extended or adjusted under 35 U.S.C. 154(b) by 0 days.

(21) Appl. No.: 13/606,654

(22) Filed: Sep. 7, 2012

(65) Prior Publication Data

US 2013/0084500 A1    Apr. 4, 2013

(30) Foreign Application Priority Data

Sep. 30, 2011 (JP) ................................ 2011-216130
Jul. 9, 2012 (JP) ................................ 2012-153214

(51) Int. Cl.
*H01M 4/00* (2006.01)

(52) U.S. Cl.
USPC .................... 429/220; 429/231.5; 427/215

(58) Field of Classification Search
None
See application file for complete search history.

(56) References Cited

U.S. PATENT DOCUMENTS

2008/0305256 A1* 12/2008 Kimble et al. ............. 427/215
2009/0233178 A1* 9/2009 Saidi et al. ............. 429/326
2010/0154206 A1 6/2010 Mao et al.

FOREIGN PATENT DOCUMENTS

| JP | 2001-500665 A | 1/2001 |
| JP | 2008-052970 A | 3/2008 |
| JP | 2009-231206 A | 10/2009 |
| JP | 2010-529623 A | 8/2010 |
| JP | 2010-535402 A | 11/2010 |
| JP | 2011-506254 A | 3/2011 |
| JP | 2012-505504 A | 3/2012 |
| WO | 98/12761 A1 | 3/1998 |
| WO | 2011/027682 A1 | 3/2011 |
| WO | WO 2012023904 A1 * | 2/2012 |

OTHER PUBLICATIONS

Extended European Search Report issued in European Application No. 12186111.6 dated Jan. 28, 2013.
Wang et al., "A $Li_3V_2(PO_4)_3$/C thin film with high rate capability as a cathode material for lithium-ion batteries", Electrochemistry Communications, vol. 12, No. 1, Jan. 1, 2010, pp. 52-55.
Zhu et al., "Synthesis and performance of lithium vanadium phosphate as cathode materials for lithium ion batteries by a sol-gel method", Journal of Power Sources, vol. 184, No. 2, Oct. 1, 2008, pp. 578-582.
Huang et al., "Synthesis and rate performabce of lithium vanaduim phosphate as cathode material for Li-ion batteries", Journal of Alloys and Componds, vol. 509, No. 14, Aptil 1, 2011, pp. 4765-4768.
Lee Hwang Sheng, "Nanostructured Phosphate-Based Electrode Materials for Lithium Batteries," Thesis, Aug. 2, 2012.

* cited by examiner

*Primary Examiner* — Patrick Ryan
*Assistant Examiner* — Haixia Zhang
(74) *Attorney, Agent, or Firm* — McDermott Will & Emery LLP

(57) ABSTRACT

A positive-electrode material includes lithium vanadium phosphate particles having an average primary particle diameter from 0.3 μm to 2.6 μm and crystallite sizes from 24 nm to 33 nm. The lithium vanadium phosphate particles are coated with a conductive carbon of a range of 0.5 mass % to 2.4 mass % with respect to a total lithium vanadium phosphate particles.

9 Claims, 1 Drawing Sheet

POSITIVE ELECTRODE MATERIAL

CROSS REFERENCE TO RELATED APPLICATIONS

The present application claims priority under 35 U.S.C. §119 to Japanese Patent Application No. 2011-216130, filed Sep. 30, 2011 and Japanese Patent Application No. 2012-153214, tiled Jul. 9, 2012, both of which are incorporated herein by reference.

BACKGROUND OF THE INVENTION

1. <Field of the Invention>

The present invention relates to a positive-electrode material, particularly a positive-electrode material including lithium vanadium phosphate, a lithium-ion secondary battery using the positive-electrode material, and method of manufacturing the positive-electrode material.

2. <Related Art>

Recently, electric storage devices such as a lithium-ion secondary battery are used as a power source of electric apparatuses, and also a power source of electric vehicles (electric vehicle (EV), hybrid electric vehicles (HEV), etc.). The electric storage devices such as the lithium-ion secondary battery are required to have more improved properties, for example, improved energy density (high capacity), improved power density (high output power) or a cycle characteristic (improved cycle life span), high safety.

In many of lithium-ion secondary batteries used in small electric apparatuses, $LiCoO_2$ or $LiCo_{1-x-y}M^1_xM^2_yO_2$ ($M^1$, $M^2$=metallic elements) with a crystal structure similar to $LiCoO_2$ is used as an active material so as to achieve an electric storage device with high capacity and long life span. However, these positive-electrode active materials have problems that, at a high temperature and a high electric potential when an abnormality occurs, the positive-electrode active materials excessively react with an electrolyte to generate a heat while releasing oxygen. In the worst case, they may ignite.

In recent years, as positive-electrode active materials which have superior heat stability even at a high temperature and a high electric potential, poly-anion-based positive-electrode materials, for example, an olivine-type Fe($LiFePO_4$) or an olivine-type Mn($LiMnPO_4$) with a crystal structure similar to the olivine-type Fe($LiFePO_4$), are considered. Such positive-electrode active materials have practically been used, for example, in electrical tools. These poly-anion-based materials have a strong crystal structure and do not easily release oxygen even at a high temperature and a high voltage.

However, an operating voltage of $LiFePO_4$ with respect to Li/Li$^+$ reference is 3.3 to 3.4 V and is lower than an operating voltage of a positive-electrode material used in general batteries. Thus, $LiFePO_4$ is insufficient in an aspect of energy density or power density. An operating voltage of $LiMnPO_4$ with respect to Li/Li$^+$ reference is 4.1 V, and $LiMnPO_4$ has theoretical capacity of 160 mAh/g. Thus, as for $LiMnPO_4$, a battery with high energy density may be expected. However, a resistance of a material itself of the $LiMnPO_4$ is high, and it is difficult to increase energy density.

Accordingly, development of a positive-electrode material with a strong crystal structure and high operating voltage has been required.

In recent years, NASICON-type lithium vanadium phosphate namely, $Li_3V_2(PO_4)_3$ attracts attention (for example, Patent Document 1: JP-A-2001-500665), as a positive-electrode material having excellent heat stability due to a strong crystal structure, and high operating voltage. The $Li_3V_2(PO_4)_3$ has high electric potential of 3.8 V (compared to Li+/Li electric potential), and high energy density of 120 to 130 mAh/g when charging 4.2 V and 150 to 180 mAh/g when charging 4.6V.

However, $Li_3V_2(PO_4)_3$ described in the patent reference 1 has a tendency to be insufficient in a rate characteristic of the lithium-ion secondary battery because of having low electric conductivity compared to $LiCoO_2$ and the likes.

Accordingly, when $Li_3V_2(PO_4)_3$ is used as an electrode active material, it is necessary to coat a plenty of conductive aids on a face of the material.

However, by the plenty of the conductive aids, an existing rate of an active material in an electrode decreases, and an energy density is decreased. Moreover, when $Li_3V_2(PO_4)_3$ is repetitively used, a cycle characteristic is decreased.

SUMMARY OF THE INVENTION

One or more embodiments provide a positive-electrode material in which a rate characteristic and a cycle characteristic are improved while maintaining both an energy density and an operating voltage of the lithium-ion secondary battery at high levels. More over, according to the embodiments, a lithium-ion secondary battery including the positive-electrode material, and a manufacturing method of the positive-electrode material are provided.

DETAILED DESCRIPTION OF THE EMBODIMENTS

Figure 1:
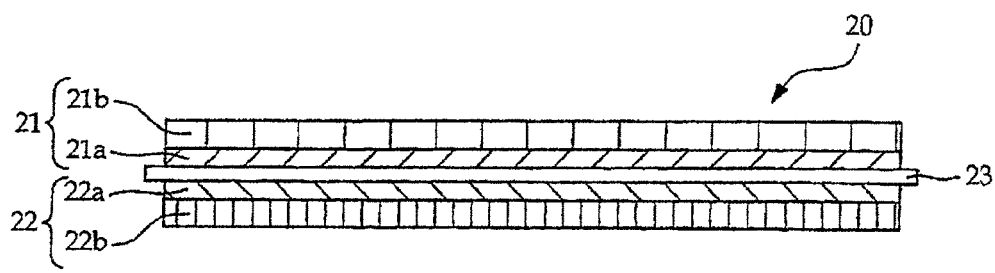
FIG. 1 is a brief sectional view illustrating one embodiment of an electric storage device (lithium-ion secondary battery).

Hereinafter, embodiments are described in detail.

According to the embodiments, a positive-electrode material which is available to a lithium-ion electric storage device, particularly to a lithium-ion secondary battery is provided.

<Positive-Electrode Material>

In the embodiments, a positive-electrode material is prepared by coating particles of lithium vanadium phosphate (LVP) with conductive carbons. The positive-electrode material may consist of only the lithium vanadium phosphate coated by the conductive carbons, but may be a mixture with other materials.

The LVP may be contained preferably 10 mass % or more with respect to a total mass of active material (mixture). It is more preferable that the LVP is contained 20 mass % or more in the active material.

The LVP has relatively high energy density, but naturally has low electric conductivity. In order to charge and discharge quickly, it is required that the LVP has conductivity, and conductive carbon is coated on surfaces of particles of the LVP.

<1. Lithium Vanadium Phosphate (LVP)>

The Lithium vanadium phosphate is expressed as $Li_xV_{2-y}M_y(PO_4)_z$. M is a metallic element with an atomic number of 11 or more, for example, one or more selected from a group formed by Fe, Co, Mn, Cu, Zn, Al, Sn, B, Ga, Cr, V, Ti, Mg, Ca, Sr, and Zr. Further, "x", "y" and "z" satisfies following formulas:

$$1 \leq x \leq 3;$$

$$0 \leq y < 2; \text{ and}$$

$$2 \leq z \leq 3.$$

According to the embodiments, as the LVP, a NASICON-type (Natrium-Super Ion Conductor) lithium vanadium phosphate, that is $Li_3V_2(PO_4)_3$ is preferably used.

According to the embodiment, the LVP may be obtained with any preparation method, which is not limited. Usually, the LVP may be obtained in particle shapes by pulverizing calcined materials According to the embodiment, particles of the LVP are preferably spherical or almost spherical. An average primary particle diameter of the particles is preferably from 0.3 to 2.6 µm, more preferably from 0.35 to 2.0 µm, and furthermore preferably from 0.5 to 0.8 µm. An area contacted with the electrolyte of each particle increases when the average primary particle diameter is under 0.3 µm, and stability of the LVP decreases. Reactivity becomes insufficient when the average primary particle diameter is over 2.6 µm. Because a surface area of particles of an active material increases by setting the average primary particle diameter in the above preferable range, an area contacted with the electrolyte increases, and electrode reaction occurs easily. As a result, a rate characteristic (charge/discharge characteristic) of the lithium-ion secondary battery is improved. The average primary particle diameter is an average value calculated by measuring diameters of 200 primary particles which are arbitrarily picked up and observed by a scanning electron microscope.

Since the LVP has the average primary particle diameter of the above preferable range, a heating condition of the particles of the LVP is uniform, a crystallization degree thereof increases, and crystal structures with few different phases can be obtained.

According to the embodiments, crystallite sizes of the respective particles of the LVP are set within a range from 24 nm to 33 nm, preferably from 26.5 nm to 30 nm, and more preferably from 26.5 nm to 28.5 nm. If the crystallite sizes are under 24 nm or if the crystallite sizes exceed 33 nm, an output power is decreased and a capacity maintenance rate is decreased.

A crystallization degree of the particles varies on a basis of preparation materials and/or caicination conditions, and a capacity characteristic and a cycle characteristic of the lithium-ion secondary battery are improved when the crystallization degree of the particles of the LVP is 98% or more.

Because particle sizes influence a density of the LVP and/or processes of coating and the likes, $D_{50}$ in particle size distribution of secondary particles of the LVP is preferably 0.5 to 25 µm.

A stability of the LVP may be decrease because an area contacted with the electrolyte increases excessively when the $D_{50}$ is under 0.5 µm, an output power may be decreased because of decrease of reaction efficiency when the $D_{50}$ is over 25 µm.

In the above preferable range of the $D_{50}$, the electric storage devices may have higher stability and higher output power. The $D_{50}$ in the particle size distribution of the secondary particles of the LVP is more preferably 1 to 10 µm, particularly preferably 3 to 5 µm. The $D_{50}$ in the particle size distribution of the secondary particles of the LVP is a value which is measured by a particle size distribution measuring device using laser diffraction method (light scattering method).

<2. Conductive Carbon>

According to the embodiments, coating of a conductive carbon on the LVP may be implemented by various methods. A method in which a coating process of the conductive carbon (for example, Ketjen black, acetylene black, carbon black of oil furnace black and the likes, and carbon nanotube and likes) is carried out after synthesis of the LVP, or a method in which a process of mixing the conductive carbon or a precursor of the conductive carbon is carried out during synthesizing LVP may be introduced.

Precursors of conductive carbon used in formation of positive-electrode coating layers may be natural macromolecules, for example saccharides and the likes which are glucose, fructose, lactose, maltose, sucrose and the likes.

By coating the LVP particles with conductive carbon having a range of 0.5 mass % to 2.4 mass %, preferably 0.6 mass % to 1.8 mass %, with respect to a total mass of the LVP, an expected electric conductivity as a positive-electrode active material may be obtained. An electric conductivity is insufficient in case of being under 0.5 mass %, and reliability decreases because side reaction by the conductive carbon increases in case of excessing 2.4 mass %.

According to the embodiments, since the average primary particle diameter of the particles of LVP is 2.6 µm or less and an amount of the conductive carbon is set as above-mentioned, an excellent electrochemical property and reliability of the LVP can be obtained.

<Manufacturing Method of Positive-Electrode Materials>

According to the embodiments, as far as the positive-electrode material includes positive-electrode material particles which are in the state that the LVP is coated with the conductive carbon, preferably that the conductive carbon is absorbed or unified by calcination and the likes on the surfaces of the LVP, the manufacturing method is not particularly limited.

According to the embodiments, however, a following method may be used.

First, in the first stage, a reaction solution including precipitation reaction products is obtained by mixing water with lithium hydroxide, vanadium pent-oxide, phosphoric acid, and conductive carbon or a conductive carbon precursor and stirring over 0.2 hour at 60 to 100° C.

The reaction solution including the precipitation reaction products is pulverized in wet process using a media mill. In a pulverization process, it is preferable that an average particle size of the pulverized products to be 2 µm or less, particularly 0.1 µm to 2 µm using a laser diffraction method, in order to obtain a precursor of the LVP with excellent reactivity and to decrease a non-uniformity of properties of batteries.

Next, a reactive precursor is obtained by spray-drying a slurry including the obtained pulverized product.

Then, the reactive precursor may be introduced to a sintering furnace, be burned over 2 hours at 600° C. to 1300° C., preferably 800° C. to 1000° C., and be pulverized if necessary. As a result, a positive-electrode material in which LVP particles with the average primary particle diameter of 2.6 µm or less are coated with a conductive carbon at a range of 0.5 mass % to 2.4 mass % with respect to a total mass of the LVP is obtained.

An adding rate of the conductive carbon, an average particle size of the reactive precursor, and a sintering temperature and time may affect a growing state of a LVP crystal, thus an attention is required to them. The LVP with a high crystallization degree, preferably 98% or more is obtained by properly selecting them.

According to the embodiments, the sizes of the LVP particle are values measured by a particle size distribution measuring device (9320-X100: NIKKISO CO LTD.) using the laser diffraction method (light scattering method), and the crystallization degrees and the crystallite sizes are values measured a X-lay diffraction device (RINIT 2000: RIGAKU corp).

<Positive-Electrode>

According to the embodiments, as far as the positive-electrode only includes the above-mentioned positive-electrode materials, the positive-electrode may include known other materials Specifically, the positive-electrode may be manufactured as follows.

A positive-electrode mixture layer is formed using a process in which a positive-electrode slurry prepared by dispersing a mixture including the positive-electrode material, bonding agents and conductive aids (by necessity) in a solvent is applied and dried on a positive-electrode current collector. After the drying step, a pressing step may be carried out. As a result, the positive-electrode mixture layer is uniformly strongly pressure-fixed to the current collector. A thickness of the positive-electrode mixture layer is 10 to 200 μm, preferably 20 to 100 μm.

A bonding agent used in formation of a positive-electrode mixture layer may include fluorine-containing resins such as poly vinylidene fluoride, acrylic binders, rubber binders such as Styrene Butadiene Rubber (SBR), and thermoplastic resins such as carboxymethyl cellulose, etc. The bonding agent is preferably fluorine-containing resins and thermoplastic resins which are chemically electrochemically stable in comparison to a non-aqueous electrolyte used in the electric storage device according to the embodiments, particularly preferably fluorine-containing resins. In addition to poly vinylidene fluoride, there are polytetrafluoroethylene, fluorinated ethylene copolymer vinylidene fluoride-3, -4 fluorinated ethylene propylene copolymer and ethylene copolymers such as ethylene fluoride-4, etc. as fluorine-containing resins. A mixing amount of the bonding agent is preferably 0.5 mass % to 20 mass % in comparison to the positive-electrode active material.

Because the LVP particle of the positive-electrode active material is coated with the conductive carbon, an amount of the conductive aid which is added other than the positive-electrode material may be a minimum or zero (depending on circumstances). Generally, the above-mentioned conductive carbon a copper, a metal such as an iron, silver, a nickel, a palladium, gold, a platinum, an indium and a tungsten, and a conductive metallic oxide such as a oxidized indium and a oxidized tin, etc. May be added to the positive-electrode mixture in a range of 0.1 mass % to 10 mass % with respect to the total mass of the LVP particles (which does not include the conductive carbon coating the LVP particles), an excellent conductivity is obtained.

Water, isopropyl alcohol, N-methylpyrrolidone, dimethylformamide, etc. may be used as a solvent for the formation of the positive-electrode mixture layer.

As far as a surface contacted with the positive-electrode mixture layer has a conductivity, a positive-electrode current collector may be any conductive members. As the positive-electrode current collector, for example, a member formed with conductive materials such as a metal, a conductive metallic oxide, a conductive carbon, etc. or a member formed by coating conductive materials on a non-conductive member may be used. The conductive materials are preferably a copper, gold, aluminum or alloy thereof or a conductive carbon. An expanded metal, a punching metal, a foil, a mesh, a foam etc. of the conductive material may be used as the positive-electrode current collector. When the conductive material is a porous member, a shape or number of through holes is not particularly limited, and may be properly set in a range where movement of the lithium-ion is hindered.

According to the embodiments, an excellent cycle characteristic may be obtained by setting a coating concentration of the positive-electrode mixture layer from 4 mg/cm$^2$ to 20 mg/cm$^2$. The cycle characteristic is depreciated when the coating concentration of the positive-electrode mixture layer is under 4 mg/cm$^2$ or over 20 mg/cm$^2$. High capacity may be acquired as the increasing coating concentration. The coating concentration of the positive-electrode mixture layer is more preferably 10 mg/cm$^2$ to 20 mg/cm$^2$. Further, in the embodiments, the coating concentration means a concentration of the positive-electrode mixture layer coated on a single side of the positive-electrode current collector. In case of forming positive-electrode mixture layers on the both sides of the positive-electrode electric collector, the positive-electrode mixture layers on the one side and other side are respectively formed in the range.

According to the embodiments, an excellent cycle characteristic may be obtained by setting a porosity rate of the positive-electrode mixture layer in 35% to 65%. The cycle characteristic is depreciated when the porosity rate of the positive-electrode mixture layer is under 35%. Although the excellent cycle characteristic may be maintained in case the porosity rate of the positive-electrode mixture layer is over 65%, the porosity rate of the positive-electrode mixture layer over 65% is not preferable due to depreciation of capacity or output power. The porosity rate of the positive-electrode mixture layer is more preferably 40% to 60%.

According to the embodiments, various types of lithium-nickel complex oxide may be used. A ratio of Ni element in the lithium-nickel complex oxide influences a proton adsorptive property of the lithium-nickel complex oxide. Ni element is preferably contained by 0.3 to 0.8 mol with respect to lithium element of 1 mol. It is further preferable that Ni element is contained by 0.5 to 0.8 mol with respect to lithium element of 1 mol. When the ratio of Ni element is too low, it may be difficult to sufficiently prevent vanadium from being eluted from $Li_3V_2(PO_4)_3$. When the ratio is within the range, as the ratio of Ni element increases, it is possible to further prevent vanadium from being eluted from $Li_3V_2(PO_4)_3$. As a result, the cycle characteristic can be improved.

<Negative-Electrode>

According to the embodiments, a negative-electrode is not particularly limited and may be prepared using known materials.

A negative-electrode mixture layer may be formed, for example, by applying and drying, on a negative-electrode current collector, a negative-electrode slurry which is prepared by dispersing a mixture of a generally used negative-electrode active material and a bonding agent in a solvent. Further, a bonding agent, a solvent, an electric collector which are similar to the positive-electrode may be used.

A lithium-based metallic material, an intermetallic compound material of a metal and a lithium metal, a lithium compound or a lithium intercalation carbon material may be used as the negative-electrode active material.

The lithium-based metallic material is for example, metallic lithium or a lithium alloy (for example, Li—Al alloy). The intermetallic compound material of a metal and a lithium metal is for example, an intermetallic compound including a tin, a silicon, etc. The lithium compound is for example, nitric lithium.

The lithium intercalation carbon material may be for example, graphite, a non-graphitizable carbon, polyacene material, etc., Polyacene-based material is for example, PAS, etc. which have a polyacene-based framework and are insoluble and infusible. The lithium intercalation carbon material is a substance that can reversibly dope lithium-ion. A thickness of a negative-electrode mixture layer is generally 10 to 200 μm and preferably 20 to 100 μm.

According to the embodiments, a coating concentration of a negative-electrode mixture layer is properly designed in accordance with a coating concentration of a positive-electrode mixture layer. In a lithium-ion secondary battery, capacity (mAh) of a positive-electrode and a negative-electrode is generally designed to be similar, in view of capacity balance or energy density of a positive-electrode and a negative-electrode. As a result, the coating concentration of the negative-electrode is set on a basis of types of a negative-electrode active material or capacity of a positive-electrode.

<Non-Aqueous Electrolyte>

According to the embodiments, the non-aqueous electrolyte is not particularly limited, and known materials may be used as the non-aqueous electrolyte. As the non-aqueous electrolyte, an electrolyte in which a general lithium salt as an electrolyte material is dissolved in an organic solvent may be used, for reasons that an electrolyzation thereof is not occurred even in high voltage and lithium-ion can stably exist.

The electrolyte material may be for example, $CF_3SO_3Li$, $C_4F_9SO_8Li$, $(CF_3SO_2)_2NLi$, $(CF_3SO_2)_3CLi$, $LiBF_4$, $LiPF_6$, $LiClO_4$, etc. or a mixture made by two or more thereof.

As the organic solvent, for example, propylene carbonate, ethylene carbonate, butylene carbonate, dimethyl carbonate, diethyl carbonate, ethyl methyl carbonate, vinyl carbonate, trifluoroacetic methyl-propylene carbonate, 1,2-dimethoxyethane, 1,2-diethoxyethane, γ-butyraldehyde as lactone, tetrahydrofuran, 1,3-dioxolan, 4-methyl-1,3-dioxolan, diethyl ether, sulfolane, methylsulfolane, acetonitrile, propionate tolyl, etc. or a mixed solvent prepared with two or more thereof is used.

The concentration of the electrolyte in the non-aqueous electrolyte solution is preferably 0.1 to 5.0 mol/L, more preferably 0.5 to 3.0 mol/L.

The non-aqueous electrolyte may be in a liquid state, or may be a solid electrolyte or a polymer gel electrolyte in which a plasticizer or a polymer is mixed.

<Separator>

According to the embodiments, the separator is not particularly limited. Known separators may be used. For example, a porous material which is durable against the electrolyte, the positive-electrode active material and the negative-electrode active material, has communicating pores, and does not have an electron conductivity may be preferably used. For example, woven fabric, nonwoven fabric, synthetic resin a small porous film, glass fiber, etc. may be used as the porous material. A small porous film of synthetic resin is preferably used. Particularly, polyolefin-based small porous film like polyethylene, polyethylene, etc. is preferable in aspects of thickness, film intensity, film resistibility.

<Electric Storage Device>

According to the embodiments, the electric storage device includes the positive-electrode with the above-mentioned positive-electrode material, the negative-electrode and the non-aqueous electrolyte.

Hereinafter, a lithium-ion secondary battery is explained as an example of the electric storage device, referring to the drawings.

FIG. 1 is a brief cross-sectional view showing an embodiment of the lithium-ion secondary battery. As described, in a lithium-ion secondary battery 20, a positive-electrode 21 and a negative-electrode 22 are opposed to each other while interposing a separator 23 therebetween.

The positive-electrode 21 is structured by a positive-electrode mixture layer 21a including the positive-electrode material of the embodiments and a positive-electrode current collector 21b. The positive-electrode mixture layer 21a is formed on a side of a separator 23 of the positive-electrode current collector 21b. The negative-electrode 22 is structured by a negative-electrode mixture layer 22a and a negative-electrode current collector 22b.

The negative-electrode mixture layer 22a is formed on a side of the separator 23 of the negative-electrode current collector 22b. These positive-electrode 21, negative-electrode 22 and separator 23 are sealed in an external container (not shown) where a non-aqueous electrolyte is charged. For example, a battery can, a lamination film, etc, may be the external container. In addition, the positive-electrode current collector 21b and the negative-electrode current collector 22b are respectively connected to lead-wires (not shown) for external terminal connection.

Figure 2:
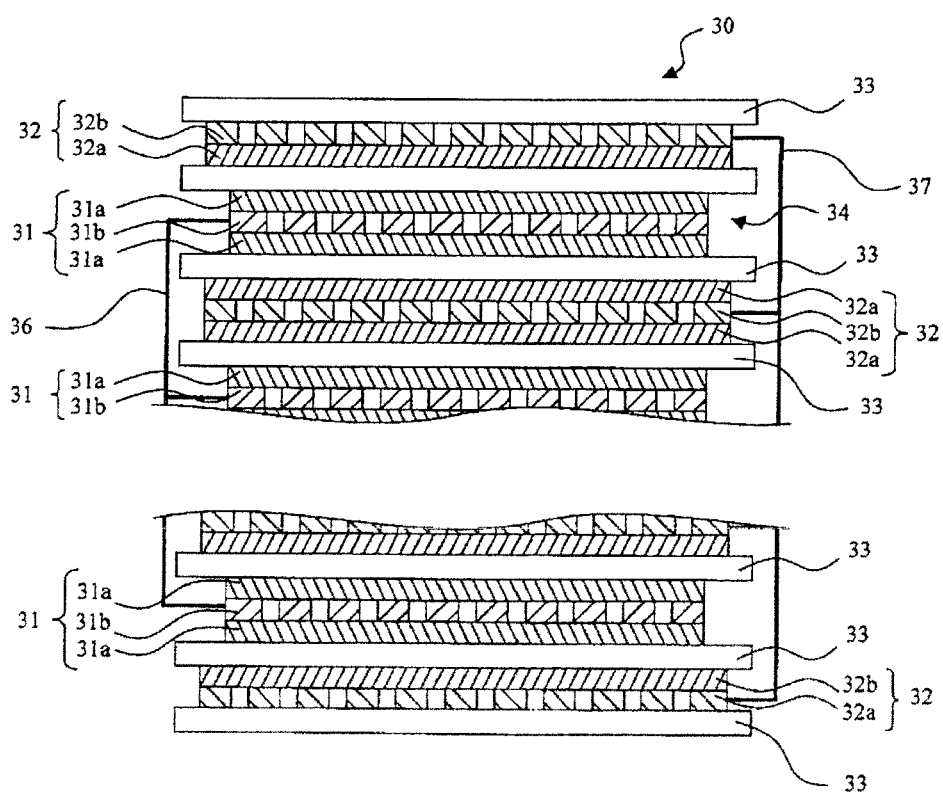
FIG. 2 is a brief sectional view illustrating other embodiment of an electric storage device (lithium-ion secondary battery).

Next, FIG. 2 is a brief cross-sectional view showing other embodiment of the lithium-ion secondary battery. As described, a lithium-ion secondary battery 30 has an electrode unit 34 in which a plurality of positive-electrodes 31 and negative-electrodes 32 are alternatively layered while respectively interposing separators 33 therebetween. In each positive-electrode 31, positive-electrode mixture layers 31a are provided on both sides of a positive-electrode current collector 31b. In each negative-electrode 32, negative-electrode mixture layers 32a are provided on both sides of a negative-electrode current collector 32b. (Further, as for the negative-electrodes 32 in the most upper layer and the most lower layer in the stacked electrodes, the negative mixture layers 32a are respectively provided only one sides).

In addition, the positive-electrode current collectors 31b respectively have projections (not shown), and the projections of the plurality of positive-electrode current collectors 31b are stacked to each other, and a lead-wire 36 is welded to the stacked part. The negative-electrode current collectors 32b also respectively have projections, and the projections of the plurality of negative-electrode current collectors 32b are stacked to each other, where a lead-wire 36 is welded.

In addition, the lithium-ion secondary battery 30 may have a lithium electrode within the external container in order to preliminarily dope (pre-dope) lithium-ion to the positive-electrode, the negative-electrode, or both of the positive and negative-electrodes. In the case, in order to make the lithium-ion to move easily, through holes extending in a stacking direction of the electrode unit 34 are formed through the positive-electrodes 31 and the negative-electrodes 32.

Further, although, in the lithium-ion secondary battery 30, the negative-electrodes are respectively positioned at the most upper layer and the most lower layer of the stacked electrodes, it may be possible that the positive-electrodes may be respectively positioned at the most upper layer and the most lower layer.

EXAMPLES

Examples are described in the below. (The present invention is not limited by the examples.)

Example 1

<Manufacture of Positive-Electrode>
(1-1) Preparation of Positive-Electrode Material 85% phosphoric acid 605 g, lithium hydroxide 220 g, pentoxide vanadium 320 g and sucrose 170 g were added to water 2 L. The mixture was stirred for one hour at 95° C. Pulverization process was performed using a wet pulverizing device until an average particle size of the disposition product of reaction solution was under 1 μm.

A reaction precursor was obtained by drying the reaction solution with a spray drying device. The obtained reaction precursor was calcined under a nitrogeonous atmosphere for 12 hours at 900° C., put out of a calcined furnace, cooled up to the room temperature, and pulverized. After the pulverization process, the primary particle diameter of LVP under a condition of $Li_3V_2(PO_4)_3$ (hereinafter, referring to C-LVP) being coated with a conductive carbon was measured. In the measuring the primary particle diameter of the LVP, the primary particle diameter was calculated based on an primary particle diameter of 200 particles picked out using SEM(S-4800 type scanning electron microscope made by Hitachi High-Technologies Corporation). The average primary particle diameter of the LVP was 0.35 μm.

In addition, an average particle size ($D_{50}$) of the deposition product was measured using a particle size distribution measuring device (9320-X100 type made by NIKKISO CO LTD.) according to Laser Diffraction Method (Light Scatterring Method).

Next, a crystal of the LVP was analyzed by a X-ray diffraction device (RINT 2000 made by RIGAKU corp.), and a crystallization degree thereof was calculated as 99.8%.

Further, the crystallization degree was obtained by performing separation of a peak of a crystal phase (LVP) and a halo from an amorphous phase at $2\theta=22°$ to $27°$, and calculating based on the following equation.

$$\text{Crystallization Degree}=C/(C+A),$$

(C: scattering intensity of crystal phase; A: scattering intensity of amorphous phase)

In addition, a mass of the LVP and a coated amount of carbon in the C-LVP were measured by a total organic carbon (TOC) analyzer (TOC-5000A made by Shimadzu corp.). A mass of the carbon was 1.7% (average value) with respect to a total mass of the LVP.

Moreover, crystallite sizes of the LVP were measured. The crystallite sizes of the LVP were analyzed by the X-ray diffraction device (RINT 2000 made by RIGAKU corp.) using diffraction peaks existing within a range of $20<2\theta<21$. A crystallite size of the LVP was 24 nm.

Further, the crystallite size was obtained by measuring a half width of the diffraction peak, and calculating based on formula of Scherrer as follow:

$$D=K\cdot\lambda/(\beta\cdot\cos\theta) \qquad \text{Formula of Scherrer}$$

D: Diameter of crystallite (nm);
λ: x-ray wavelength for measuring(nm);
β: expanse of diffraction line by crystallite size (radian)
θ: Bragg angle of diffraction line (radian)
K: Constant (1-2) Positive-Electrode Mixture A positive-electrode mixture slurry was obtained mixing following materials.

| | |
|---|---|
| C-LVP | 90 part by mass |
| Bonding agent (poly vinylidene fluoride (PVdF) | 5 part by mass |
| Conductive aid (carbon black) | 5 part by mass |
| Solvent (N-methyl-2-pyrrolidone (NMP)) | 100 part by mass |

The positive-electrode slurry was applied on the positive-electrode collector of aluminum foil (thickness 30 μm) and dried, and then the positive-electrode mixture layer is formed on the positive-electrode current collector. The coating concentration (per one surface) of the positive-electrode mixture layer was 15 mg/cm².

(2) Manufacture of Negative-Electrode

The negative-electrode mixture slurry was obtained mixing the following materials for a negative-electrode mixture layer.

| | |
|---|---|
| Active material (graphite) | 95 part by mass |
| Bonding agent (PVdF) | 5 part by mass |
| Solvent (NMP) | 150 part by mass |

The negative-electrode slurry was applied on the negative-electrode collector of copper foil (thickness 10 μm) and dried, and then the negative-electrode mixture layer was formed on the negative-electrode current collector. The coating concentration (per one surface) of the negative-electrode mixture layer was 7 mg/cm².

(3) Preparation of Electrolyte

The non-aqueous electrolyte was obtained by mixing at a rate of ethylene carbonate (EC) with 28.2 mass %, ethyl methyl carbonate (EMC) with 27.9 mass %, and dimethyl carbonate (DMC) with 30.5 mass %, and lithium phosphate hexafluoride (Li-PF6) with 12.4 mass %.

(4) Preparation of Lithium-Ion Secondary Battery

Using nine sheets of the positive-electrodes and ten sheets of the negative-electrodes prepared in the above, the lithium-ion secondary battery as disclosed in FIG. 2 was prepared. Specifically, the positive-electrodes and the negative-electrodes were alternatively stacked while interposing polyethylene separators therebetween. A tape was wound around an obtained layered stack so as to fix the sheets of electrodes. An aluminum metallic tab was welded to a side of the each positive-electrode of the layered stack and a copper tab is welded to a side of the each negative-electrode. The tabs of the positive-electrode current collector were stacked and an aluminum metallic lead was welded to the stacked tabs. Similarly, the tabs of the negative-electrode current collector were stacked and a nickel metallic lead was welded to the stacked tabs. The stacked electrodes with the leads were inserted in aluminum lamination external member with a size of 104 mm×140 mm×10 mm, and a melt-seal of the external member was carried out aside an electrolyte inlet to seal the electrodes while the positive-electrode lead and the negative-electrode lead were lead outside. The non-aqueous electrolyte was injected from the electrolyte inlet and interpenetrated to insides of the electrodes and then the electrolyte inlet is vacuum encapsulated.

Examples 2 to 4, Comparative Examples 1 and 2

Steps similar to the steps of Example 1 were carried out to manufacture Lithium-ion Secondary batteries, except for the pulverization processes of pulverizing the deposition product by the wet pulverization apparatus so that the average particle size becomes 1.5 μm (Example 2), 2 μm (Example 3), 3 μm (Example 4), 5 μm (Comparative Example 1) and 10 μm (Comparative Example 2).

Examples 5 to 8, Comparative Examples 3 to 5

Steps similar to the steps of Example 1 were carried out to manufacture Lithium-ion Secondary batteries, except for the adding amount of sucrose, that is, 30 g (Comparative Example 3), 50 g (Example 5), 70 g (Example 6), 100 g(Example 7), 240 g (Example 8), 260 g (Comparative Example 4) and 300 g (Comparative Example 5).

Example 9

Steps similar to the steps of Example 1 were carried out to manufacture Lithium-ion Secondary batteries, except that the (1-2) positive-electrode Mixture and the (4) Preparation of Lithium-ion Secondary battery were changed as follows:

(1-2) Positive-Electrode Mixture

A positive-electrode mixture slurry was obtained mixing following materials.

| | |
|---|---|
| C-LVP | 30 part by mass |
| NCA (NCA503H, made by JFE Mineral) | 60 part by mass |
| Bonding agent (poly vinylidene fluoride (PVdF)) | 5 part by mass |
| Conductive aid (carbon black) | 5 part by mass |
| Solvent (N-methyl-2-pyrrolidone (NMP)) | 100 part by mass |

The positive-electrode slurry was applied on the positive-electrode collector of aluminum foil (thickness 30 μm) and dried, and then the positive-electrode mixture layer was formed on the positive-electrode current collector. The coating concentration (per one surface) of the positive-electrode mixture layer was 15 mg/cm$^2$.

(4) Preparation of Lithium-Ion Secondary Battery

Using two sheets of the positive-electrodes and two sheets of the negative-electrodes prepared in the above, the lithium-ion secondary battery as disclosed in FIG. 2 was prepared. Specifically, the positive-electrodes and the negative-electrodes are alternatively stacked while interposing polyethylene separators therebetween. A tape was wound around an obtained layered stack so as to fix the sheets of electrodes. An aluminum metallic tab was welded to a side of the each positive-electrode of the layered stack and a copper tab was welded to a side of the each negative-electrode. The tabs of the positive-electrode current collector were stacked and an aluminum metallic lead was welded to the stacked tabs. Similarly, the tabs of the negative-electrode current collector were stacked and a nickel metallic lead was welded to the stacked tabs. The stacked electrodes with the leads were inserted in aluminum lamination external member with a size of 60 mm×80 mm×1 mm, and a melt-seal of the external member was carried out aside an electrolyte inlet to seal the electrodes while the positive-electrode lead and the negative-electrode lead were lead outside. The non-aqueous electrolyte was injected from the electrolyte inlet and interpenetrated to insides of the electrodes and then the electrolyte inlet was vacuum encapsulated.

Examples 10 to 14, Comparative Examples 6 and 7

Steps similar to the steps of Example 9 were carried out to manufacture Lithium-ion Secondary batteries, except for the pulverization processes of pulverizing the deposition product by the wet pulverization apparatus so that the average particle size becomes 0.7 μm (Comparative Example 6), 1.5 μm (Example 10), 2 μm (Example 11), 2.3 μm (Example 12), 2.7 μm (Example 13), 3 μm (Example 14), and 5 μm (Comparative Example 7).

The measured average primary particle diameters, carbon coating amounts, crystallization rates, and crystallite sizes were shown in Tables 1 and 2.

The following test was carried out to evaluate performance of each battery.

(5) Charging and Discharging Test (5-1) Measurement of a Capacity Maintenance Rate The positive-electrode lead and the negative-electrode lead of the batteries manufactured as mentioned above were connected to respective terminals of a charging and discharging testing apparatus (made by FUJITSU ACCESS CORP.). Cycle tests of 1000 cycles were carried out by charging for 2.0 hours at a charging current rate of 1 C and with a charging voltage of 4.2V under a condition of constant current and voltage, and discharging at a discharging current rate of 0.5 C and with a discharging stop voltage of 2.5V.

Capacity maintenance rates after 1000 cycles were calculated based on the following equation.

Capacity maintenance rate (%)=discharging capacity (Ah) at 1000th cycle/discharging capacity (Ah) at 1st cycle×100

The result is shown in Tables 1 and 2.

(5-2) Measurement of a High Load Discharging Rate

With similar manners as above-mentioned, charging capacity (Ah) was calculated by connecting a battery to the charging and discharging test device, charging for 2.0 hours at a charging current rate of 1 C and with a charging voltage of 4.2V under a condition of constant current and voltage, and discharging at a discharging current rate of 0.2 C and with a discharging stop voltage of 2.5V.

Next, charging capacity (Ah) was calculated by charging for 2.0 hours at a charging current rate of 1 C and with a charging voltage of 4.2V under a condition of constant current and voltage, and discharging at a discharging current rate of 5.0 C and with a discharging stop voltage of 2.5V.

A high load discharging rate (%) was calculated from each discharging capacity according to the following equation.

High load discharging rate (%)=discharging capacity (Ah) at a discharging current rate of 5.0 C/discharging capacity (Ah) at a discharging current rate of 0.2 C The result is shown in Table 1.

In addition, the above described charging and discharging current (C) is expressed as a following equation.

Current rate (C)=current value (A)/battery current capacity (Ah)

That is, for example, 1 C means a current value which allows a battery with current capacity of nominal capacity to be discharged under a condition of a constant current and to stop discharging for 1 hour exactly, and 0.25 C means a current which allows a battery with current capacity of nominal capacity to stop discharging for 4 hours.

(5-3) Measurement of Output Power

With similar manners as above-mentioned, a battery was connected to the charging and discharging test device and charged up to a half of a battery capacity. After the charge, discharges for 10 sec were carried out at respective current rates 0.5 C, 1 C, 2 C and 3 C. Voltages for the respective current rates at points of time of the 10 sec were measured.

The measured voltages were plotted with respect to the corresponding current rates, so as to obtain a linear approximate equation. 2.5V as the minimum voltage was substituted in the linear approximate equation, so as to obtain a maximum current value toward a minimum electric potential in the 10 sec. An output power characteristics was expressed as a product of the obtained current value and the minimum electric potential (=current value×electric potential).

TABLE 1

|  | Average primary particle diameter μm | Carbon coating amount mass % | Crystallization Rate % | capacity maintenance rate after 1000 cycles % | High load discharging rate % | Battery evaluation |
|---|---|---|---|---|---|---|
| Example 1 | 0.35 | 1.7 | 99.8 | 88.0 | 94.0 | GOOD |
| Example 2 | 0.5 |  | 99.7 | 86.0 | 92.0 | GOOD |
| Example 3 | 0.7 |  | 99.2 | 82.0 | 90.0 | GOOD |
| Example 4 | 2.6 |  | 98.0 | 70.0 | 72.0 | GOOD |
| Comparative Example 1 | 3.0 |  | 97.3 | 53.0 | 63.0 | NG |
| Comparative Example 2 | 3.5 |  | 97.0 | 42.0 | 59.0 | NG |
| Comparative Example 3 | 0.7 | 0.3 | 98.6 | 64.0 | 68.0 | NG |
| Example 5 |  | 0.5 | 99.8 | 73.0 | 73.0 | GOOD |
| Example 6 |  | 0.7 | 99.7 | 82.0 | 82.0 | GOOD |
| Example 7 |  | 1.0 | 99.4 | 83.0 | 87.0 | GOOD |
| Example 3 |  | 1.7 | 99.2 | 82.0 | 90.0 | GOOD |
| Example 8 |  | 2.4 | 98.0 | 76.0 | 88.0 | GOOD |
| Comparative Example 4 |  | 2.6 | 97.8 | 62.0 | 84.0 | NG |
| Comparative Example 5 |  | 3.0 | 97.9 | 51.0 | 82.0 | NG |

TABLE 2

|  | Crystallite Size nm | Primary particle diameter μm | Output Power mW | Capacity maintenance rate % |
|---|---|---|---|---|
| Comparative Example 6 | 23 | 0.2 | 1400 | 75 |
| Example 9 | 24 | 0.35 | 2000 | 80 |
| Example 10 | 26.5 | 0.5 | 2300 | 86 |
| Example 11 | 27.5 | 0.7 | 2300 | 84 |
| Example 12 | 28.5 | 1.1 | 2250 | 85 |
| Example 13 | 30 | 2.0 | 2100 | 82 |
| Example 14 | 33 | 2.6 | 1900 | 75 |
| Comparative Example 7 | 34 | 3.0 | 1400 | 60 |

Lithium-ion secondary battery should need to further have a rate characteristic and a cycle characteristic, in addition to requirements of safety and high capacity which are conventionally required.

The test results show that the lithium-ion secondary battery using the positive-electrode material of the embodiments has all excellent cycle and rate properties (load discharging rate), in addition to the safety and high energy density that the LVP originally includes.

The present invention is not limited to the above embodiments and examples, and may be variously modified.

According to the embodiments, a positive-electrode material may include lithium vanadium phosphate particles. An average primary particle diameter of the lithium vanadium phosphate particles may be 0.3 μm or more and 2.6 μm or less. Crystallite sizes of the lithium vanadium phosphate particles may be 24 nm or more and 33 nm or less. The lithium vanadium phosphate particles may be coated with a conductive carbon of a range of 0.5 mass % to 2.4 mass % to a total lithium vanadium phosphate particles.

If this positive-electrode material is adopted in a lithium-ion secondary battery, since the Lithium vanadium phosphate (LVP) which normally has an electrically insulation property becomes to have a conduction property, a rate characteristic related to a charging and discharging efficiency is improved and a decrease of a capacity maintenance rate is reduced in spite of repetitive use of the lithium-ion secondary battery.

In addition, according to this positive-electrode material, an energy density and an operating voltage of the lithium-ion secondary battery are maintained in high levels.

In the positive-electrode material, the lithium vanadium phosphate may be expressed as $Li_xV_{2-y}M_y(PO_4)_z$, M may be a metallic element of an atomic number of 11 or more, for example, one or more selected from a group formed by Fe, Co, Mn, Cu, Zn, Al, Sn, B, Ga, Cr, V, Ti, Mg, Ca, Sr, and Zr, and $1 \leq x \leq 3$, $0 \leq y < 2$, and $2 \leq z \leq 3$. Particularly, $Li_3V_2(PO_4)_3$ may be very properly used.

The $Li_xV_{2-y}M_y(PO_4)_z$, particularly $Li_3V_2(PO_4)_3$, release few oxygen even in a state of a high temperature and a high voltage because of a strong crystal structure. As a result, deterioration of the cycle characteristic of the lithium-ion secondary battery does not almost occur because side reaction of oxygen and electrolyte is not almost generated.

A crystallization degree of the lithium vanadium phosphate particles may be 98% or more. As a result, since the crystal structure of the LVP becomes strong and an elution of oxygen or vanadium is avoided, the cycle characteristic is maintained and the capacity does not decrease. Safety of the battery increases when the elution of oxygen or vanadium to the electrolyte is avoided.

Moreover, according to the embodiments, a lithium-ion secondary battery may include a positive-electrode having this positive-electrode material, a negative-electrode, and a non-aqueous electrolyte.

Furthermore, according to the embodiments, this positive-electrode material may be manufactured by: acquiring a reaction solution including a precipitation reaction product by mixing water with lithium hydroxide, pent-oxide vanadium, phosphorus, and conductive carbon or a conductive carbon precursor and stirring over 0.2 hour at 60 to 100° C.; pulverizing the reaction solution including the precipitation reaction product in wet process using a media mill; acquiring a reaction precursor by spray-drying slurry including a pulverized product which is obtained by pulverizing the reaction solution; and calcining a lithium vanadium phosphate particle coated with conductive carbon over 2 hours at 600° C. to 1300° C.

According to the above manufacturing method, lithium vanadium phosphate particles having the average primary particle diameter from 0.3 to 2.6 μm and the crystallite sizes from 24 nm to 33 nm and coated with a conductive carbon of a range of 0.5 mass % to 2.4 mass % to a total lithium vanadium phosphate particles and also having the crystallization degree of 98% or more is easily and effectively prepared.

The positive-electrode material of the embodiments and the lithium-ion secondary battery including the positive-electrode material contribute to improvements of the rate characteristic and capacity maintenance rate after multi-cycle use.

The positive-electrode material of the embodiments and the lithium-ion secondary battery including the positive-electrode material have advantages of being excellent safety, originally high energy density, and high power density.

What is claimed is:

1. A positive-electrode material comprising:
   lithium vanadium phosphate particles, an average primary particle diameter of which is 0.3 μm or more and 2.6 μm or less, and crystallite sizes of which are 24 nm or more and 33 nm or less,
   wherein a crystallization degree of the lithium vanadium phosphate particles is 98% or more, and
   wherein the lithium vanadium phosphate particles are coated with a conductive carbon of a range of 0.5 mass % to 2.4 mass % with respect to a total mass of the lithium vanadium phosphate particles.

2. The positive-electrode material according to claim 1, wherein the lithium vanadium phosphate particles have an average primary particle diameter of from 0.35 μm to 2.0 μm, and crystallite sizes of 26.5 nm to 30 nm, and wherein the lithium vanadium phosphate particles are coated with a conductive carbon in the range of 0.6 mass % to 1.8 mass % with respect to a total mass of the lithium vanadium phosphate particles.

3. The positive-electrode material according to claim 1, wherein the lithium vanadium phosphate is expressed as $Li_xV_{2-y}M_y(PO_4)_z$,
   wherein M is one or more selected from a group formed by Fe, Co, Mn, Cu, Zn, Al, Sn, B, Ga, Cr, V, Ti, Mg, Ca, Sr, and Zr, and
   wherein a relation of x, y and z satisfies $1 \leq x \leq 3$, $0 \leq y < 2$, and $2 \leq z \leq 3$.

4. The positive-electrode material according to claim 1, wherein the lithium vanadium phosphate is $Li_3V_2(PO_4)_3$.

5. The battery according to claim 3, wherein the lithium vanadium phosphate is expressed as $Li_3V_2(PO_4)_3$.

6. A lithium-ion secondary battery comprising:
   a positive-electrode including the positive-electrode material according to claim 1;
   a negative-electrode; and
   a non-aqueous electrolyte.

7. The battery according to claim 6, wherein the lithium vanadium phosphate is expressed as $Li_3V_2(PO_4)_3$.

8. The battery according to claim 6, wherein the lithium vanadium phosphate is expressed as $Li_xV_{2-y}M_y(PO_4)_z$,
   wherein M is one or more selected from a group formed by Fe, Co, Mn, Cu, Zn, Al, Sn, B, Ga, Cr, V, Ti, Mg, Ca, Sr, and Zr, and
   wherein a relation of x, y and z satisfies $1 \leq x \leq 3$, $0 \leq y < 2$, and $2 \leq z \leq 3$.

9. The battery according to claim 6, wherein the lithium vanadium phosphate particles have an average primary particle diameter of from 0.35 μm to 2.0 μm, and crystallite sizes of 26.5 nm to 30 nm, and wherein the lithium vanadium phosphate particles are coated with a conductive carbon in the range of 0.6 mass % to 1.8 mass % with respect to a total mass of the lithium vanadium phosphate particles.

* * * * *